United States Patent [19]

Vuong

[11] Patent Number: 4,841,465

[45] Date of Patent: Jun. 20, 1989

[54] TRANSFORMATION CIRCUIT ARRANGEMENT

[75] Inventor: The A. Vuong, Stuttgart, Fed. Rep. of Germany

[73] Assignee: Telefunken Fernseh und Rundfunk GmbH, Hanover, Fed. Rep. of Germany

[21] Appl. No.: 69,445

[22] PCT Filed: Oct. 9, 1986

[86] PCT No.: PCT/EP86/00578
§ 371 Date: Jun. 16, 1987
§ 102(e) Date: Jun. 16, 1987

[87] PCT Pub. No.: WO87/02489
PCT Pub. Date: Apr. 23, 1987

[30] Foreign Application Priority Data
Oct. 16, 1985 [DE] Fed. Rep. of Germany ..... 3536773.3

[51] Int. Cl.$^4$ ............................................. G06F 15/332
[52] U.S. Cl. ..................................................... 364/725
[58] Field of Search ................................. 364/725, 727

[56] References Cited

U.S. PATENT DOCUMENTS

| 3,742,201 | 6/1973 | Groeinsky | 364/727 |
| 4,062,060 | 12/1977 | Nussbaumer | 364/725 |
| 4,646,256 | 2/1987 | Bracewell | 364/725 |

Primary Examiner—Gary V. Harkcom
Assistant Examiner—Dale M. Shaw
Attorney, Agent, or Firm—Spencer & Frank

[57] ABSTRACT

The invention relates to a function system and its use in image transmission. According to the invention, a vector is transformed with a matrix in such a manner that simple logic addition and linkage circuits are sufficient.

14 Claims, 4 Drawing Sheets $$\underline{B} = \begin{bmatrix} 0 & 1 & 1 & 0 & 1 \\ 1 & 1 & 0 & 1 & 0 \\ 1 & 0 & 1 & 0 & 1 \\ 0 & 1 & 0 & 1 & 1 \\ 1 & 0 & 1 & 1 & 0 \end{bmatrix}$$

$j = 0 = (000)_2$
$j = 1 = (001)_2$
$j = 2 = (010)_2$
$j = 4 = (100)_2$
$j = 3 = (011)_2$
$j = 5 = (101)_2$
$j = 6 = (110)_2$
$j = 7 = (111)_2$

| k   | 0 | 1 | 2 | 3 | 4 |
|-----|---|---|---|---|---|
| $2^0$ | 0 | 1 | 1 | 0 | 1 |
| $2^1$ | 1 | 1 | 0 | 1 | 0 |
| $2^2$ | 1 | 0 | 1 | 0 | 1 |
| j(k) | 6 | 3 | 5 | 2 | 5 |

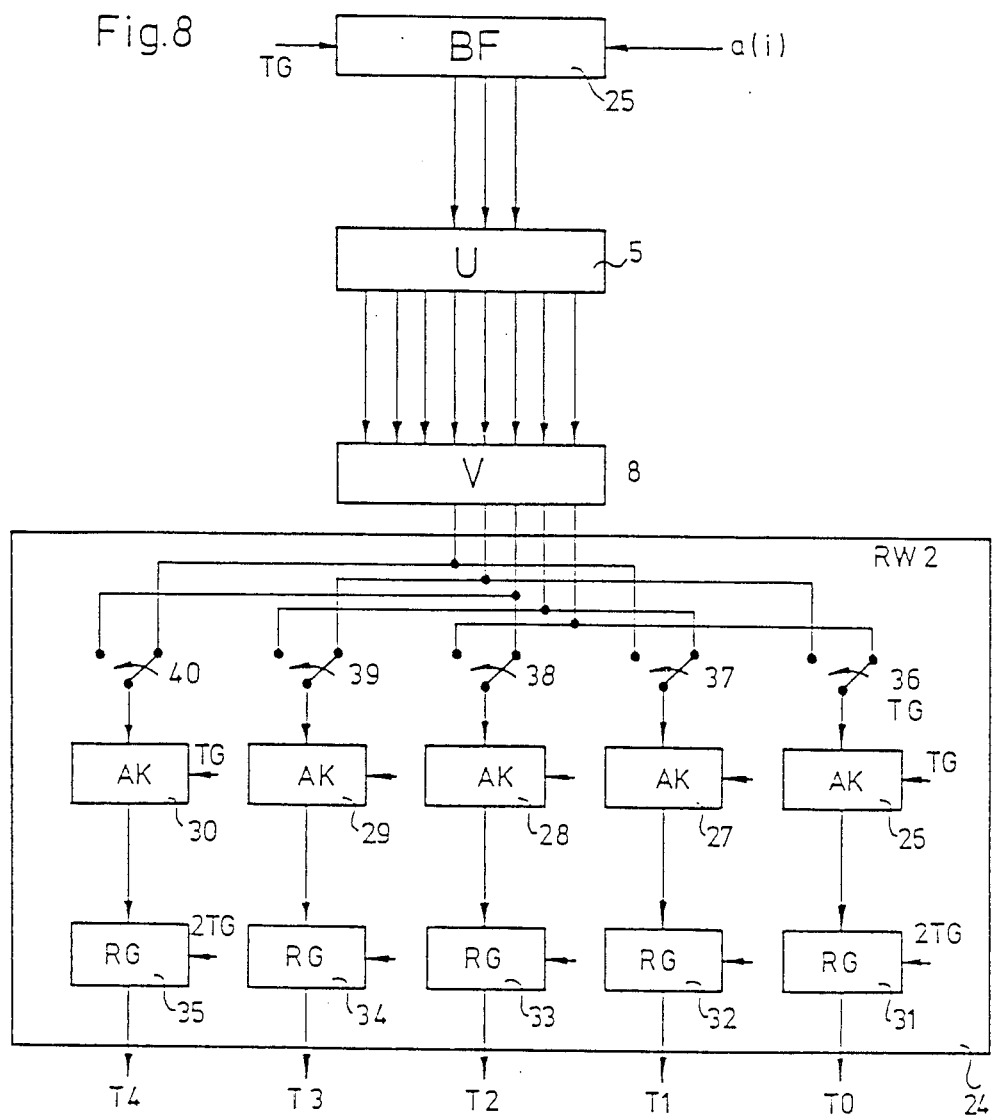

TRANSFORMATION CIRCUIT ARRANGEMENT

BACKGROUND OF THE INVENTION

The invention relates to a transformation circuit arrangement for the transformation of a first unknown vector (A) with the aid of a matrix ($B^2$).

The publication, NTZ Archiv, Volume 3 (1981), No. 1, pages 9 et seq. discloses a novel function system (m functions) and its use for image transmission. With the aid of feedback connected shaft registers, bivalent periodic pulse sequences can be generated. By orthonormalizing these sequences, one obtains an orthonormal, binary function system which serves as the basic function system for a signal transformation (m transformation), similarly to a Fourier or Walsh transformation.

SUMMARY OF THE INVENTION

It is the object of the invention to provide a transformation circuit which permits the transformation of vectors with little circuitry requirements.

This is accomplished by the above circuit arrangement wherein the matrix $B^2$ has rows containing a second, known vector B which is cyclically shifted by rows, both vectors having the same length, and the first vector (A) is divided into partial vectors (P), with each partial vector (P) being fed to an addition circuit and to a longic linkage circuit connected to the outpur of the addition circuit. The output of the linkage circuits are fed to a calculating unit which furnishes the transform T as the result. Advantageous modifications of the invention are discussed further hereunder.

According to the invention, a known vector is transformed with an unknown vector in that a matrix is constructed in such a manner that a known vector is cyclically shifted by rows and thus a square matrix is constructed. The transformation of the unknown vector with the thus constructed matrix produces the transform in a manner realizable with simple circuitry. According to the invention, it is assumed that both vectors have the same length N and the vector constructing the matrix is present in binary form. To simplify the circuit, the unknown vector is divided into P groups each having a length R. The length of the groups is less than the total length of the vector. The last group is filled cup with zeros if necessary.

For parallel processing, the individual groups are each fed to an addition stage. The output signals are fed to a calculating unit, via logic linkage circuits, e.g. simple wiring, and possibly—if the linkage circuits all have the same configuration—with a decoding circuit switched according to a modulo-R relationship connected to their outputs. The number to be divided in the modulo-R relationship is the number of elements of the water. The calculating unit furnishes the transform as its output signal.

If the individual groups are processed serially, only one addition stage and one linkage circuit are required. The individual groups of the vector are multiplexed and fed, in accordance with the modulo-R relationship, to an accumulator and to a register which furnishes the transform.

With these measures it is accomplished that circuitry requirements are reduced since the multiplication operations to be performed of necessity are not required for the transformation of vectors.

BRIEF DESCRIPTION OF THE DRAWINGS

For a better understanding of the invention, the invention will be described in greater detail below with reference to the drawing figures. It is shown in:

FIG. 8, a block circuit diagram for serial processing.

DETAILED DESCRIPTION OF THE PREFERRED EMBODIMENT

Figure 1:
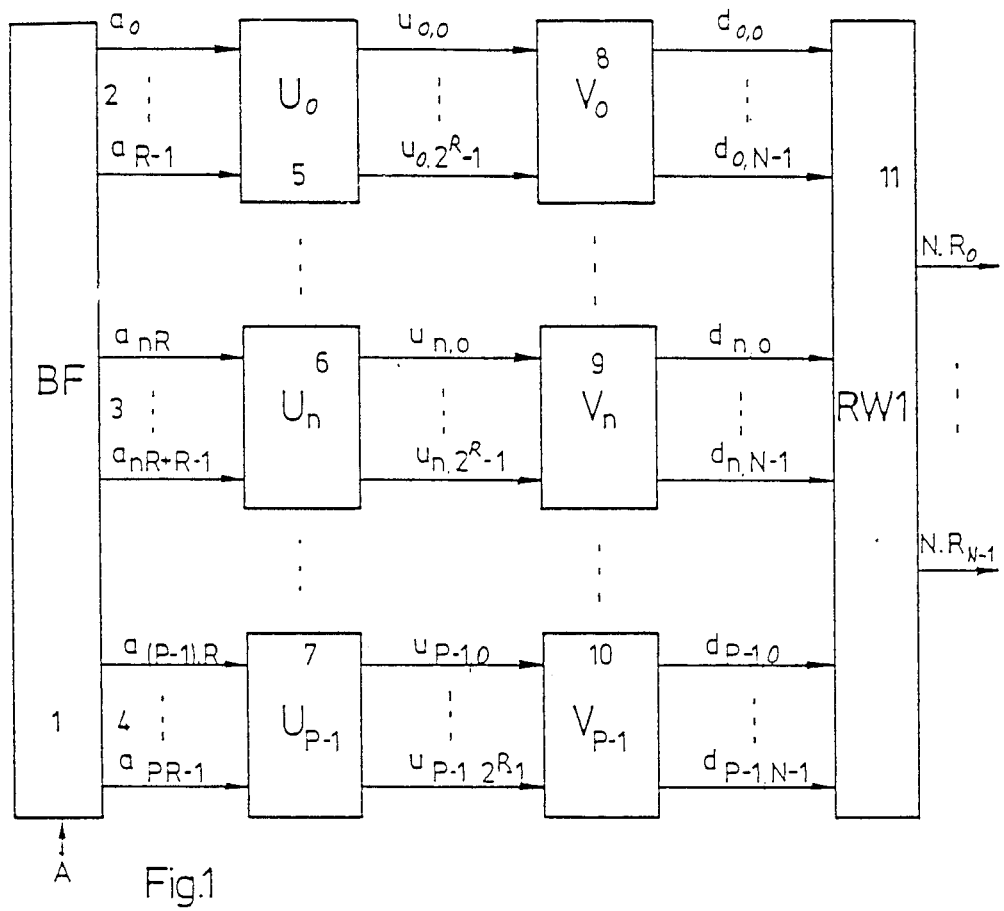
FIG. 1, a block circuit diagram for parallel processing.

FIG. 1 is a block circuit diagram for the transformation of an unknown vector A with the aid of a matrix $B^2$. All elements a(i) of vector A are read into a buffer 1 and are there divided into groups 2, 3, and 4, each having a length R. Groups 2, 3, 4 are each fed to an addition circuit 5, 6, 7. The outputs of addition circuits 5, 6, 7 are each connected with a logic linkage circuit 8, 9, 10. The outputs of linkage circuits 8-10 lead to a calculating unit 11, at whose outputs the transform is present. The characteristic properties of matrix $B^2$ are inherent in the wiring of the linkage circuits 8-10 (VO, VN, VP−1).

Figure 2:
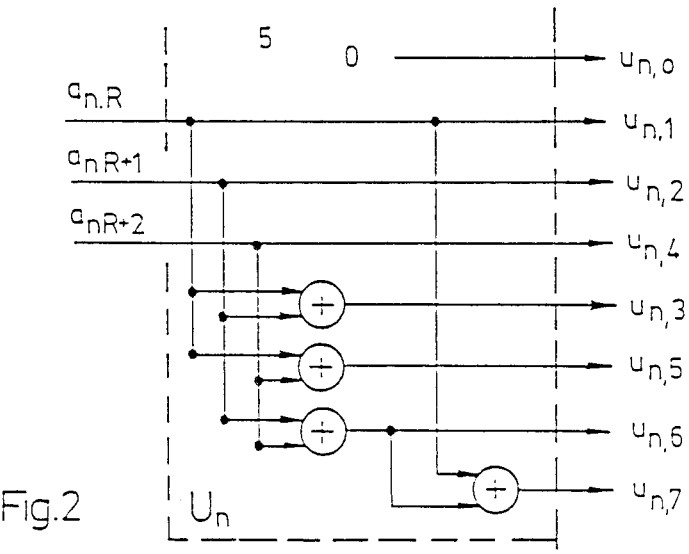
FIG. 2, the structure of an addition circuit.

FIG. 2 shows the configuration of an addition circuit 5. According to the R elements of a group P, where P=INT(N/R)+1, addition circuit 5 has R inputs a(n*R+m), where m=0, 1, . . . , R−1 and n is the sequence number of the respective addition and linkage circuits, n=1, . . . , P, for the a(Rn+m) elements of vector A. Addition circuit 5 furnishes output signals U(n, j). It is configured according to the following mathematical relationship:

$$u(n,j) = \sum_{m=0}^{R-1} a_{R*n+m} * x_{j,m} \quad (1)$$

where x(j,m) is the $m^{th}$ digit of the binary representation of number j, j=2exp(R)−1, a(R(n)) is the $n^{th}$ group of the unknown vector and m is the ranking in the group.

The determination of 2exp(R) values u(n,j) in each block U(n) requires only 2exp(R)−R−1 additions since the following condition is met:
(a) determination of u(n,0), u(n,0)=0;
(b) determination of u(n,j) for j=2exp(m), u(n,j)=a(R*n+m);
(c) determination of n(n,j) which are the sum of two u(n,j) according to (b); the binary representation of j then has two digits of the value "1";
(d) determination of u(n,j) expressed as the sum of two values according to (b) and (c); the binary representation of j then has three digits of the value "1";
(e) etc.

Figures 3, 4, 5, 6:
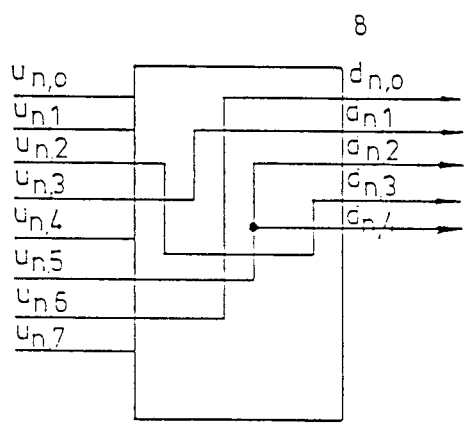
FIG. 3, a formation law for the addition circuit.
FIG. 4, a square matrix.
FIG. 5, a formation law for the linkage circuit.
FIG. 6, a logic linkage circuit.

FIG. 3 shows as an example the output U(n,0) shown in FIG. 2 with zero. Outputs U(n,1), U(n,2) and U(n,4) are connected directly with inputs a(n*R), a(n*R+1) and a(n*R+2). The result of the addition of a(n*R) and a(n*R+1) is present at output U(n,3); the addition result of a(n*R) and a(n*R+2) is present at output U(n,5), the addition result of a(n*R+1) and a(n*R+2) is present at output U(n,6) and the addition result of all inputs is present at output U(n,7).

FIG. 4 shows the square matrix $B^2$ of the known vector B (0 1 1 0 1) which is cyclically shifted by rows. The cyclical shift of vector B is continued beyond the range of square matrix $B^2$ if the N elements of vector A are not a whole number multiple of the R group elements. The number of rows is increased to the number of the whole number multiple of the R group elements according to the mathematical rule $$R-(n-\text{int}(n/R)*R). \qquad (3)$$

FIG. 5 shows the formation law for a logic linkage circuit. For the build-up of the linkage circuit, the R rows of matrix $B^2$ corresponding to the G group are utilized to link inputs U(n,j) with outputs d(n,k) of linkage circuit 8. The inputs and outputs are linked according to the following mathematical relationship:

$$j(k) = \sum_{m=0}^{R-1} 2^{m}*b_{(k+m)} \qquad (2)$$

where b are the column elements of matrix $B^2$, j(k) are the inputs and k the outputs of linkage circuit 8. Inputs j(k) are connected to outputs k of linkage circuit 8 according to Equation 2. Example: column k=0 has a value, at R=3, of $0*2^0+1*2^1+1*2^2$. The result obtained is that input U(n,6) must be connected with output d(n,0); j(k) forms a structure which is called a V structure. This structure is independent of n. That means that all linkage circuits 8-10 have the identical configuration.

However, for parallel processing it is also possible to build a corresponding linkage circuit for each group G according to Equation 2, with the rows of matrix $B^2$ employed being each shifted by R rows. If the last group of vector A has been filled up with zeros, the rows of matrix $B^2$ will be expanded, according to its formation law, by the number of zeros. Then the corresponding outputs of linkage circuits 8-10 can be fed directly to an accumulator.

FIG. 6 shows the circuit configuration of the linkage circuit according to the formation law of Equation 2. Outputs d(n,k) are connected with inputs U(n,j) according to the formation law of FIG. 5.

Figure 7:
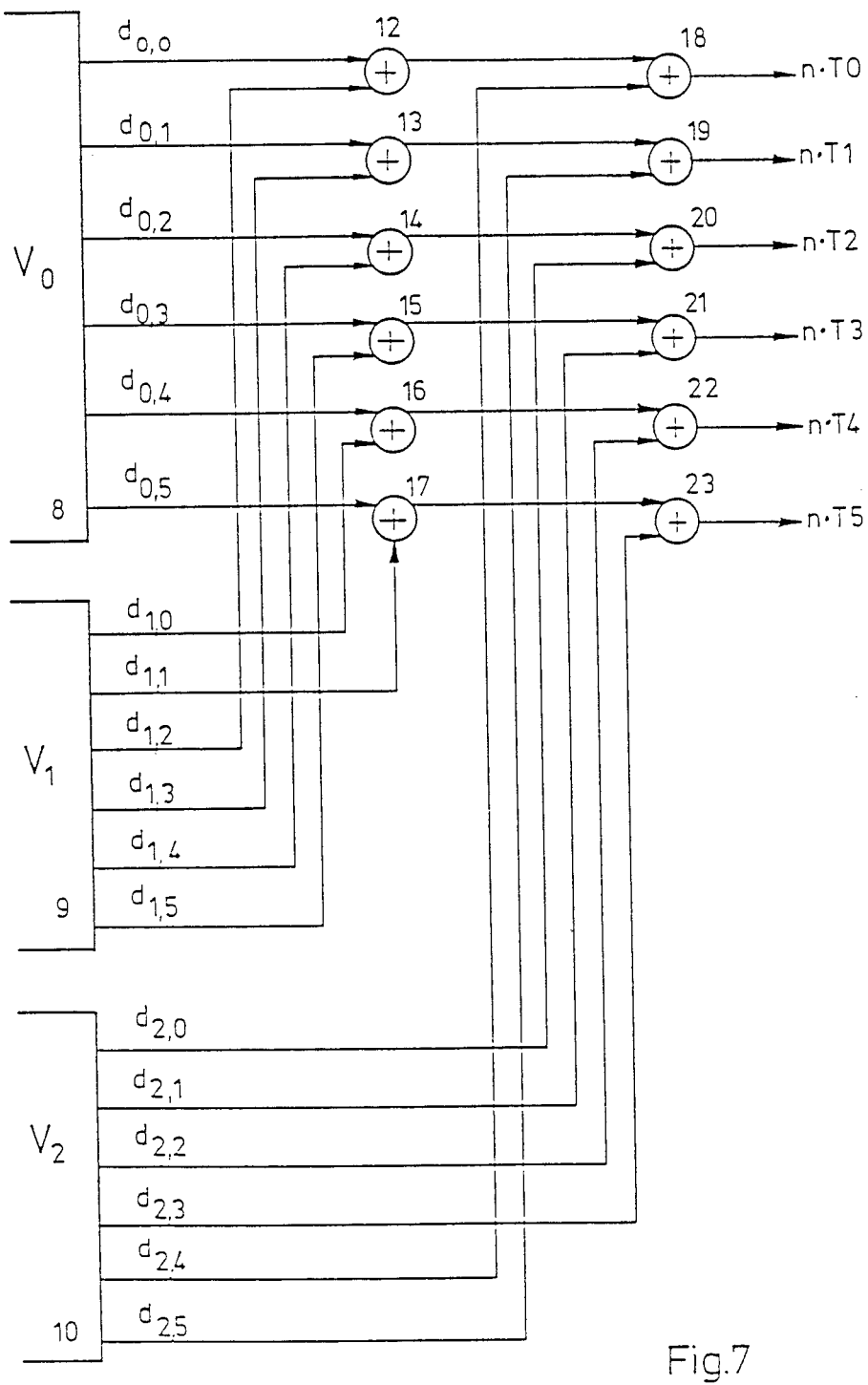
FIG. 7, a calculating unit.

If during parallel processing all linkage circuits 8-10 have the same configuration, the outputs of the individual linkage circuits 8-10 will be added according to n-int(n/R)*R to the preceding linkage circuit 8-10. As can be seen in FIG. 7, output d(0,0) of linkage circuit 8 is added to output d(1,2) of linkage circuit 9 and to output d(2,4) of linkage circuit 10. The transform T(0)-T(5) is present at the output of adders 18-23. However, since vector A is multiplied not only with vector B, but also with its square matrix $B^2$, transform T must also be divided by the number N of elements of vector B. If, during parallel processing, a corresponding linkage circuit is constructed according to Equation 2 for each group, the corresponding outputs d(0,0) will be linked with d(1,0) and d(2,0); d(0,1) will be linked with d(1,1) and d(2,1); d(0,2) will be linked with d(1,2) and d(2,2); etc. and the values at the outputs are added to one another.

For serial processing according to FIG. 8, vector A is shifted into a buffer 25 having a length R. The outputs of buffer 25 are connected with addition circuit 5. This is followed by a linkage circuit 8. According to the formation law of n*(N-int(n/R)*R), outputs d(n,k) are fed, with the aid of multiplexers 36-40, to accumulators 26-30. The outputs of the accumulators are connected with registers 31-35. Buffer 25 and accumulators 26-30 are loaded after a time interval T(G), registers 31-35 after a time interval P*T(G). Multiplexers 36-40 are likewise shifted on at time intervals T(G). At the end of the calculating operation, transform T is present at the output of registers 31-35. Simultaneously with loading of registers 31-35, accumulators 26-30 are set back.

This circuit arrangement is used, for example, for the performance of a discrete correlation or a discrete convolution. The circuit arrangement can be used as a discrete cyclic correlator for the pulse detection during code multiplex transmission, for time delay measurements in radar, as a matched filter, to perform m-transformations in image processing, in cryptographic applications, for error corrections or for synchronization of digital data transmissions.

If a plurality of circuit arrangements according to FIGS. 1 and/or 8 are connected in parallel, a plurality of vectors and/or matrixes can be transformed into one spectral region.

The following circuits can be used as modules for a digital correlator: one or a plurality of D flip-flops in the form of integrated circuits '74 can be used for reference numeral 1 (see in this connection, Texas Instruments, "The TTL Data Book"). One or a plurality of full adders '83 can be used for reference numerals 5, 6 and 7, for reference numerals 8, 9 and 10 the conductor paths are linked or wired accordingly. For reference numeral 11, one or a plurality of full adders '83 or '283 can be used, for reference numerals 12-23, again one or a plurality of full adders '83 or '283, for reference numeral 25, one or a plurality of serial in/parallel out integrated circuits '95 or '164, for reference numerals 26-30, one or a plurality of D flip-flops and full adders '74 and '83, for reference numerals 31-35 one or a plurality of D flip-flop '74 and for each of reference numerals 36-40 one or a plurality of multiplexers '53. The "''" here stands for TTL circuits belonging to families 74, 74LS, 74ALS, 74S, etc. For example, a module '00 corresponds to integrated circuits 7400, 74LS00, 74AS00 or 74S00.

I claim:

1. Circuit arrangement for the transformation of a first unknown vector with the aid of a matrix, comprising:

the matrix is constructed in such a manner that the rows of said matrix contain a second, known vector which is cyclically shifted by rows; both the first, unknown vector and said second, known vector have the same length; said first vector is divided into a plurality of partial vectors; each said partial vector is output to an addition circuit and to a logic linkage circuit connected to the output of the respective said addition circuit; and the output of each respective said linkage circuit is output to a calculating unit which produces the transform of said first unknown vector as a result.

2. Circuit arrangement according to claim 1, wherein said partial vectors all have the same length and are filled up with zeros if necessary.

3. Circuit arrangement according to claim 1, wherein said buffer has a buffer length which corresponds to the length of said first vector.

4. Circuit arrangement according to claim 1, wherein said addition circuit operates on each said partial vector in accordance with the following mathematical relationship:

$$u(n,j) = \sum_{m=0}^{R-1} a_{R*n+m} * x_{j,m},$$

wherein u(n,j) represents individual elements of the output signal from the respective said addition circuit corresponding to a binary number j, n corresponds to the sequence number of said addition circuit, N is the number of elements in said first unknown vector, R is the number of elements in each of said partial vectors, and $x_{j,m}$ is the m-th digit of the binary representation of the number j.

5. Circuit arrangement according to claim 1, wherein said linkage circuit the following mathematical relationship:

$$j(k) = \sum_{m=0}^{R-1} 2^m * b_{(k+m)},$$

wherein k represents individual output elements from the respective said linkage circuit, j(k) represents individual input elements to the respective said linkage circuit, $b_{k+m}$ represents individual column elements of said matrix, m is an integer ranging from zero to a value (R−1), and R is the number of elements in each of said partial vectors.

6. Circuit arrangement according to claim 5, wherein, for parallel processing, each said linkage circuit has a plurality of outputs, the outputs of each respective said linkage circuit being additively connected together according to the following mathematical relationship:

$$n*(N-int(n/R)*R),$$

wherein n corresponds to the sequence number of each said linkage circuit, N is the number of elements in said first unknown vector, and R is the number of elements in each of said partial vectors.

7. Circuit arrangement according to claim 5, wherein, for serial processing, the outputs of said linkage circuit are connected to the inputs of a plurality of multiplexers according to the following mathematical relationship:

$$n*(N-int(n/R)*R),$$

wherein n corresponds to the sequence number of each said linkage circuit, N is the number of elements in said first unknown vector, and R is the number of elements in each of said partial vectors.

8. Circuit arrangement according to claim 7, wherein said multiplexers are connected to the respective inputs of a plurality of accumulators.

9. Circuit arrangement according to claim 8, wherein the outputs of said accumulators are connected to the respective inputs of a plurality of registers.

10. Circuit arrangement according to claim 8, wherein said partial vectors of said first vector are periodically read into said buffer after each of a plurality of recurring time intervals.

11. Circuit arrangement according to claim 10, wherein said buffer has a buffer length which corresponds to the total combined length of said partial vectors.

12. Circuit arrangement according to claim 10, wherein said multiplexers are switched on after each of said time intervals.

13. Circuit arrangement according to claim 10, wherein said accumulators are charged after each of said time intervals.

14. Circuit arrangement according to claim 10, wherein, after every second one of said time intervals, the result of said accumulators is taken over by said registers and said accumulators are set back.

* * * * *